UNITED STATES PATENT OFFICE.

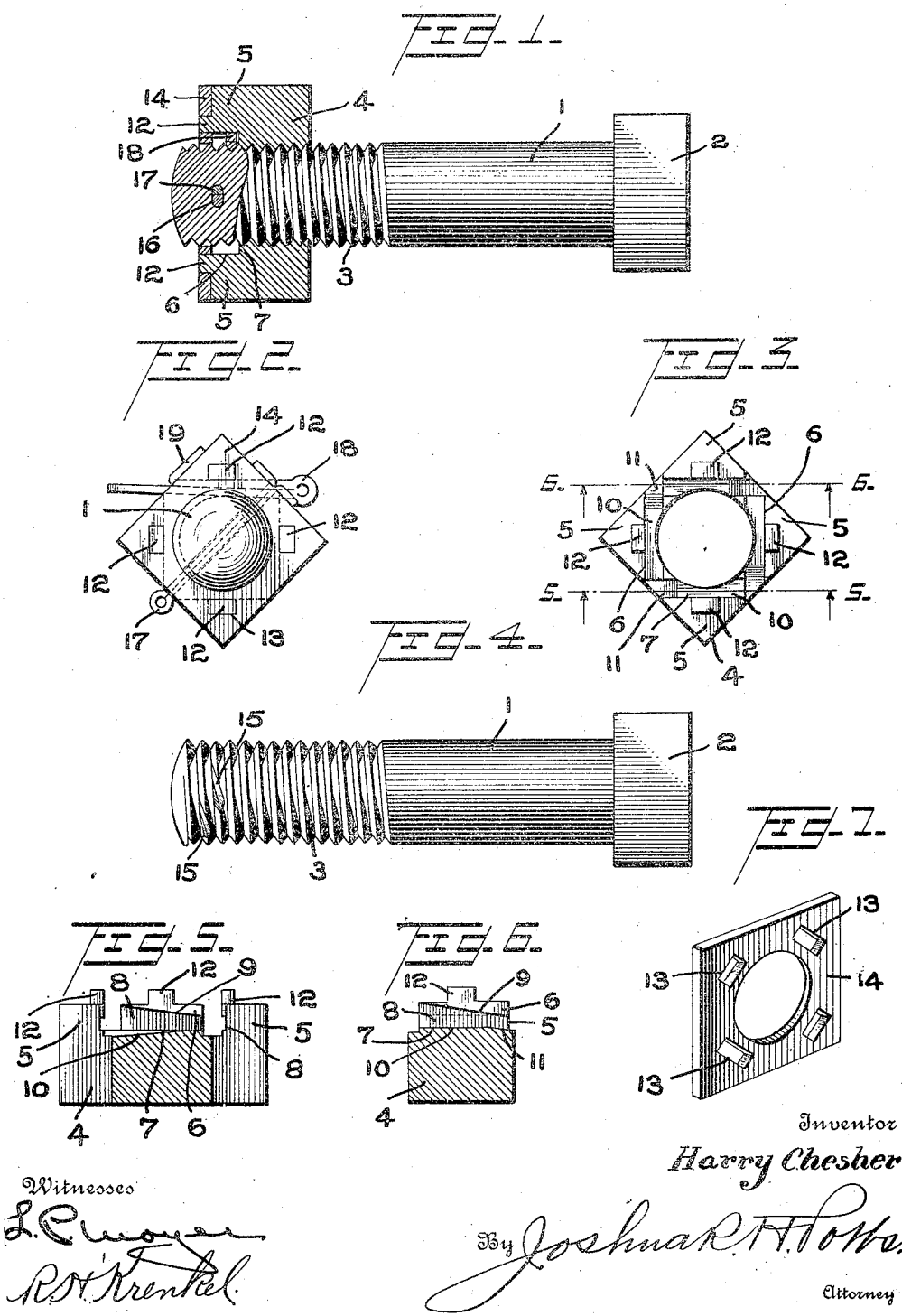

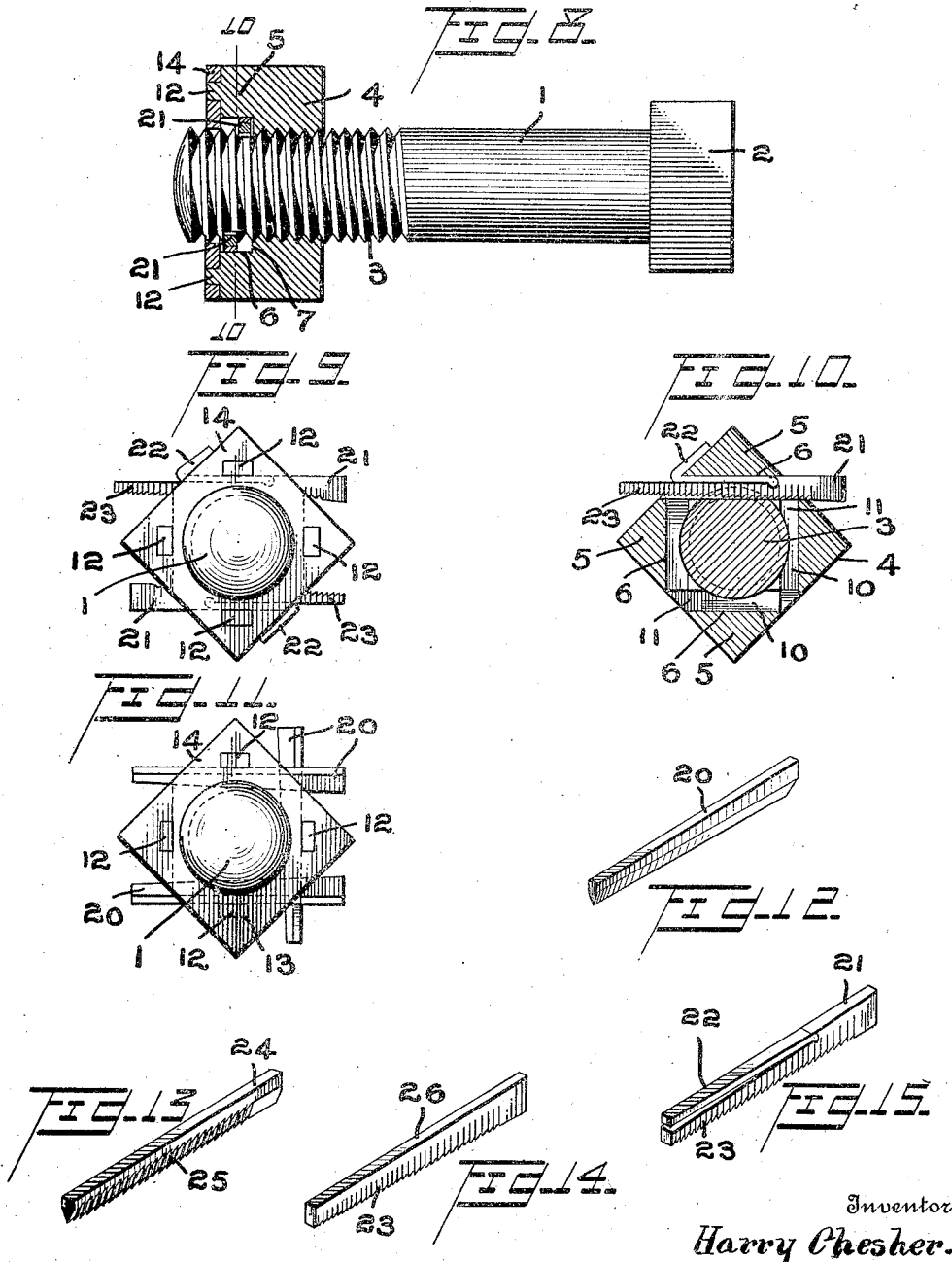

HARRY CHESHER, OF PHILADELPHIA, PENNSYLVANIA.

NUT-LOCK.

1,083,919.   Specification of Letters Patent.   Patented Jan. 13, 1914.

Application filed December 24, 1912. Serial No. 738,471.

*To all whom it may concern:*

Be it known that I, HARRY CHESHER, a citizen of the United States, residing at Philadelphia, in the county of Philadelphia and State of Pennsylvania, have invented certain new and useful Improvements in Nut-Locks, of which the following is a specification.

My invention relates to improvements in nut locks, the object of the invention being to provide an improved construction of nut and improved locking means which absolutely prevent movement of the nut on the bolt, yet allow the latter to be secured at various longitudinal adjustments on the bolt.

A further object is to provide an improved construction of nut with an improved locking key positioned on the bolt diagonally of the threads, and which is adapted to be located in a groove in the thread either previously formed in the thread or cut by the key.

A further object is to provide an improved locking nut which is adapted for use in connection with an ordinary cotter pin positioned through a hole in the bolt, and which is adapted to permit adjustment of the nut relative to the cotter and securely locked at any position of adjustment.

With these and other objects in view, the invention consists in certain novel features of construction and combinations and arrangements of parts as will be more fully hereinafter described and pointed out in the claims.

In the accompanying drawings: Figure 1 is a view in elevation of a bolt showing my improved nut and locking mechanism thereon in section, and also showing a portion of the bolt in longitudinal section. Fig. 2 is an end view of the construction illustrated in Fig. 1. Fig. 3 is a face view of the nut with the plate removed. Fig. 4 is a view in elevation of the bolt. Fig. 5 is a view in section on the line 5—5 of Fig. 3. Fig. 6 is a view in section on the line 6—6 of Fig. 3. Fig. 7 is a perspective view of the plate 14. Fig. 8 is a view showing a bolt in elevation and a nut in section illustrating a modification. Fig. 9 is an end view of the construction illustrated in Fig. 8. Fig. 10 is a view in section on the line 10—10 of Fig. 8. Fig. 11 is a view similar to Fig. 9 illustrating another modification, and Figs. 12, 13, 14, and 15 are perspective views of various forms of locking keys.

1 represents a bolt provided at one end with the ordinary head 2, and at its other end with screw-threads 3 to receive my improved nut 4 screwed thereon. The nut 4 in its outer face is recessed or cut out around the bolt opening forming a series of lugs 5. In the rectangular form of nut illustrated, four of these lugs are provided at the corners of the nut, and the inner walls 6 of said lugs are straight and spaced from the bolt opening. For clearness of description I shall hereinafter refer to the inner faces of the lugs as walls, and that portion of the nut between said walls and the bolt opening as surfaces 7. By reference particularly to Figs. 5 and 6, it will be seen that the walls 6 are grooved longitudinally as shown at 8, the outer walls of said grooves being inclined as shown at 9, while the surfaces 7 are straight throughout a portion of their length as indicated at 10 and are inclined at one end as illustrated at 11. This particular shape permits locking keys to be positioned at different angles relative to the nut and bolt and be securely held in either position as will be more fully hereinafter explained.

The lugs 6 are formed with outwardly projecting studs 12 which are preferably, although not essentially, angular in form as indicated, and these studs are projected through openings 13 in a covering plate 14, the plate and the nut being preferably welded together, yet of course, the parts may be secured in other ways.

When the plate is in position, it holds the several lugs against spreading movement. In other words, it prevents any possibility of the lugs being broken or bent by the wedging action of the keys hereinafter referred to.

As indicated most clearly in Fig. 4, the threads 3 of the bolt 1 may be formed with grooves 15 which are at an angle to the threads, and these grooves 15 are arranged in stepped formation in circular series around the bolt, so that they are adapted to receive the keys in any position of adjustment.

In Figs. 1 and 2, I have illustrated the bolt as having a transverse opening 16 for the reception of a cotter pin 17, this cotter pin being extended between the lugs 5 and bent backward at one end to effectually lock.

In Figs. 1 and 2, I have illustrated the nut as locked with the cotter, but also locked by means of a split key 18. This key, like all the other keys used, is of general wedge shape as shown, and is located in one of the grooves 8 of the lug 5 and forced through one of the grooves 15 in the bolt, the outer end 19 of said key 18 being preferably bent back against the nut so as to prevent any possibility of movement.

By reason of the length or depth of the lugs 5, it will be seen that the cotter pin 17 may be projected through the opening 16 and securely hold the nut at various positions of the nut on the bolt.

When the proper adjustment is had, the locking key 18 is forced into place and there can be no further movement of the nut. Furthermore, the key 18 prevents any possibility of vibration causing the nut to move on the bolt or vice versa, and when used in connection with the cotter, the lock is secure and absolute.

Instead of employing a split key 18 such as shown in Figs. 1 and 2, I might employ a key 20 without this split as indicated in Fig. 12, and I might employ as many of these keys 20 as desired, the several keys crossing each other. A simple arrangement of keys is shown in Fig. 11, wherein I illustrate three of the keys 20, but the invention of course is not limited to any particular number.

Instead of providing the grooves 15 in the threads 3 of the bolt, I may use a self cutting key 21, one form of which is illustrated in Figs. 8, 9, 10, and 15. This self cutting key 21 is provided with a soft metal member 22 brazed or otherwise secured to the main portion of the key and adapted to be bent back against the nut as indicated in Figs. 9 and 10.

The main portion of the key throughout one edge, and at both sides is formed with cutting teeth 23 so that the key cuts its own way through the threads of the bolt without mashing or jamming the threads.

I would have it understood that it is not my intention to upset the thread, but to cut it so that the nut can be removed from the bolt and not be locked by reason of jammed threads.

The key 21 is shown as having a relatively flat inner face, but I may employ a cutting key 24 having a sharp cutting edge 25 as illustrated in Fig. 13. In Fig. 14 I illustrate a key 26 similar to key 24 except that the flexible portion 21 is dispensed with and the solid bar used.

It will thus be noted that in connection with my improved nut I may use various forms of key to lock the same to the bolt, and I may use keys which extend diagonally of the threads either in grooves already provided for them or cut by means of the key, and I may of course provide other forms of wedges which position themselves between the threads of the bolt and do not cut the same. The scoring or grooving 9, together with the surfaces 10 and 11 in the nut permit of thus locating the keys and by reason of such a construction of nut, I am enabled to resort to a wide variation in the employment of the keys and cotter, and absolutely lock the nut on the bolt at any position of adjustment.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. As a new article of manufacture, a nut having lugs on one face, said lugs having flat inner surfaces positioned at an angle to each other and having key receiving grooves therein adapted to wedge between the said lugs and the threads of a bolt in the nut, substantially as described.

2. As a new article of manufacture, a nut having lugs on one face, a plate secured to said lugs, means adapted to bear against the lugs and lock the nut on a bolt, said nut having the inner walls of its lugs scored or grooved, and said nut having its surfaces between the lugs and the bolt opening straight throughout a portion of their length and inclined throughout another portion of their length, substantially as described.

3. The combination with a bolt, a nut on the bolt having lugs on its outer face, a plate secured to said lugs, and fixed to the nut, and a locking key located between one of the lugs and the bolt, and at an angle to the threads of the bolt, substantially as described.

In testimony whereof I have signed my name to this specification in the presence of two subscribing witnesses.

HARRY CHESHER.

Witnesses:
R. H. KRENKEL,
CHAS. E. POTTS.